United States Patent [19]

Matsumoto

[11] 3,777,411
[45] Dec. 11, 1973

[54] EDUCATIONAL DEVICE
[75] Inventor: Teruo Matsumoto, Tokyo, Japan
[73] Assignee: Epoch Company Ltd., Tokyo, Japan
[22] Filed: Apr. 18, 1972
[21] Appl. No.: 245,114

[30] Foreign Application Priority Data
Nov. 15, 1971  Japan.............................. 46/91236

[52] U.S. Cl..................................................... 35/9 R
[51] Int. Cl. ............................................ G09b 3/02
[58] Field of Search ................... 35/9 R, 48 R, 31 R

[56] References Cited
UNITED STATES PATENTS
2,866,275  12/1958  Reynolds............................. 35/9 R
2,855,703  10/1958  Stanton................................ 35/9 R
2,311,217  2/1943   Emmert............................. 35/48 R
2,585,099  2/1952   Emmert............................... 35/9 R
2,742,713  4/1956   Villanueva........................... 35/9 R Primary Examiner—Robert W. Michell
Assistant Examiner—J. H. Wolff
Attorney—James D. Halsey, Jr.

[57] ABSTRACT

An educational device featuring a housing provided with a plurality of compartments within which are stored marbles, a receptacle for receiving marbles discharged from the compartments, a slot within the housing into which a series of cards are deposited, each of the cards being provided with indicia designating a problem to be solved and multiple answers thereto; a plurality of operating members corresponding to the multiple answers and mounted to the casing for selectively moving a marble from each storage compartment to a position from which it may drop into the receptacle, each of the cards additionally being provided with a coded answer to the problem permitting a marble to drop into the receptacle only as the operating member corresponding to the correct answer is actuated.

5 Claims, 7 Drawing Figures

PATENTED DEC 11 1973    3,777,411

PATENTED DEC 11 1973 3,777,411

EDUCATIONAL DEVICE

BACKGROUND OF THE INVENTION

The present invention relates generally to educational devices in which the child is presented with a series of problems and multiple choice answers thereto. Such teaching devices are usually complicated in construction and expensive while frequently failing to retain the child's interest. In contrast, the present invention utilizes a simple mechanical housing construction into which an infinite number of problem-containing cards are inserted while stimulating the child's interest.

SUMMARY OF THE INVENTION

The educational device of the present invention features a housing provided with a plurality of storage compartments within which are located marbles. The housing is further provided with a receptacle for receiving marbles only as the child correctly answers questions. A slot is provided in the housing into which a series of cards are inserted. The cards identify the problem and multiple choice answers thereto. Each card is provided with a coded answer to the problem. Extending outwardly from the housing are a plurality of operating members corresponding to the multiple choice answers displayed on the card. As the operating member corresponding to the correct answer is depressed, one of the marbles is permitted to pass from the storage compartment through the coded cut-out portion of the card and then drop into the receptacle indicating to the child that the correct answer has been selected. If the correct operating members are pressed, the card blocks the path of the marbles preventing them from dropping into the receptacle.

DESCRIPTION OF THE PREFERRED EMBODIMENT

Figure 1:
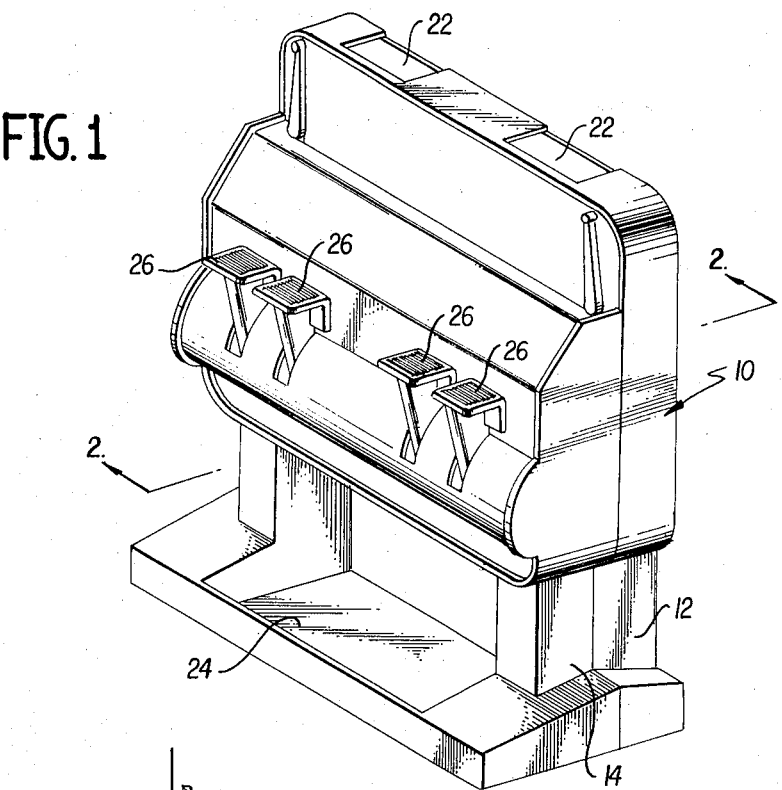
FIG. 1 is a perspective view of the educational device embodying the present invention into which cards containing problems and answers are inserted.

The educational device is designated generally by reference numeral 10 in FIG. 1 and comprises a housing consisting of two sections 12 and 14 suitably fastened together, for example, by screws 16.

Figure 6:
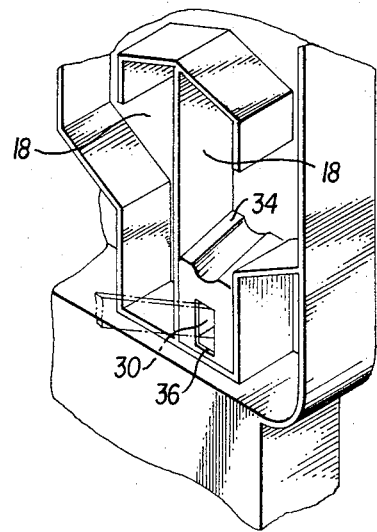
FIG. 6 is a perspective view of a portion of the housing illustrating two of the four compartments within which the marbles are stored and a representative reciprocating block moved by each of the operating members for raising the marbles to a higher position at which time the marble is either blocked by the card or permitted to pass through a coded cut-out opening contained therein after which it drops into the receptacle designating a correct answer.

Within section 12 of the housing are formed four separate storage compartments 18, two of these compartments being illustrated in FIG. 6. The storage compartments 18 are filled with marbles 20 through openings 22 formed at the top of the section 12 of the housing, as illustrated in FIG. 1.

Section 14 of the housing is provided with a receptacle 24 for receiving the marbles, as explained in detail hereinafter.

Figure 5:
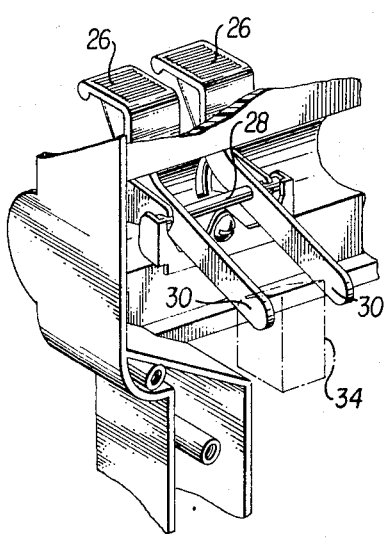
FIG. 5 is a perspective view of a portion of the housing illustrating how the operating members are attached thereto.

The housing is further provided with four operating members or handles 26 suitably mounted for rotation about rods 28, as illustrated in FIG. 5. The operating members 26 terminate in end portions 30 which protrude through openings 32 formed in section 14 of the housing thereafter extending into the storage compartments 18 of section 12 of the housing.

Within each of the storage compartments 18 is a slidably mounted block 34 provided with an opening 36 into which the end portion 30 of the corresponding operating member 26 extends, as seen in FIGS. 5–6. As will now be apparent, as each of the operating members 26 is depressed, its end portion 30 is rotated upwardly causing its corresponding block 34 to be raised from the bottom position illustrated in FIG. 2 to the top position illustrated in FIG. 3. In this manner, the marble 20 is raised upwardly within the storage compartment 18 corresponding to the operating member 26 being actuated.

Figure 2:
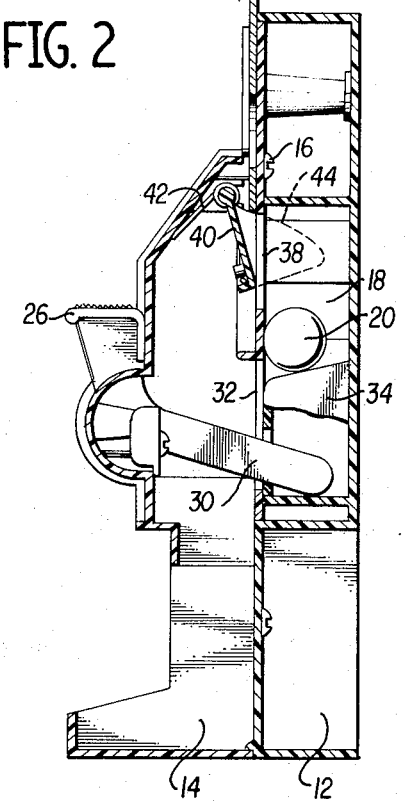
FIG. 2 is a cross-sectional view taken along line 2—2 of FIG. 1 illustrating a representative operating member in its normal position at which time the marble in the corresponding storage compartment is in its normal position.
Figure 3:
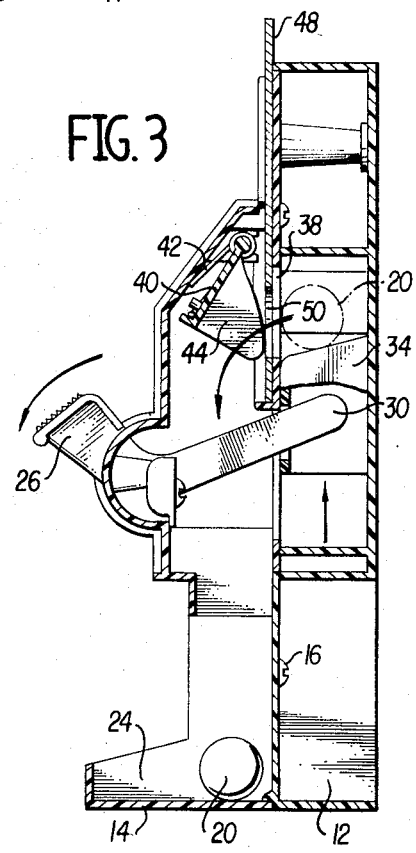
FIG. 3 is a cross-sectional view taken along line 2—2 of FIG. 1 illustrating a representative operating member depressed so as to raise the marble within the corresponding storage compartment and the card containing the problem and multiple choice answers inserted in place within the housing, the raised marble being free to pass through a coded cut-out opening within the card to then drop into the receptacle signaling that the child has correctly answered the problem.
Figure 7:
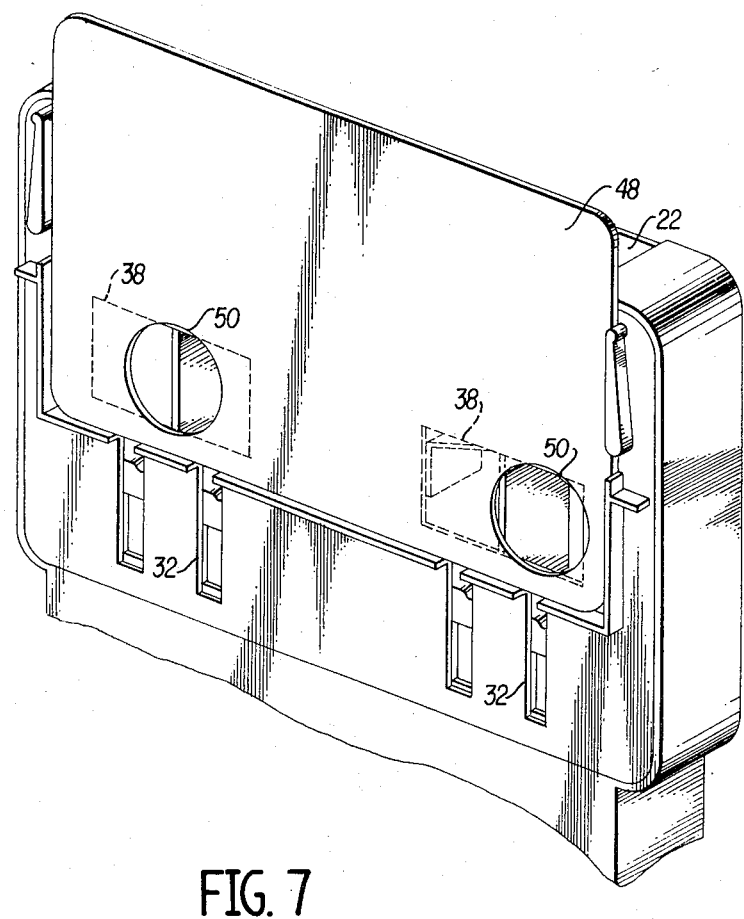
FIG. 7 is a perspective view of a portion of the housing illustrating the windows through which the raised marbles may pass and the relationship of the coded cut-out portions of the card thereto, it being apparent that as the operating member on the right-hand side is depressed raising the marble within the right-hand storage compartment it is free to pass through the coded cut-out portion and one of the windows after which it drops into the receptacle.

As seen in FIGS. 2, 3 and 7, section 14 of the housing is provided with windows 38 through which the marbles 20 may pass after being raised to the uppermost position illustrated in FIG. 3. However, section 14 of the housing is further provided with a plate 40, as illustrated in FIGS. 2 and 3, which is normally urged by the spring 42 to block or cover the windows 38. The plate 40 is additionally provided with a perpendicular flange 44 which entends through an additional opening in the wall of section 14 into section 12 of the housing.

Formed as an integral part of section 14 of the housing is a vertical slot within which a plurality of playing cards 48 are inserted. As will be apparent from FIGS. 2 and 3, as the playing card 48 is pushed downwardly the flange 44 and plate 40 are rotated clockwise thus exposing the windows 38.

Figure 4:
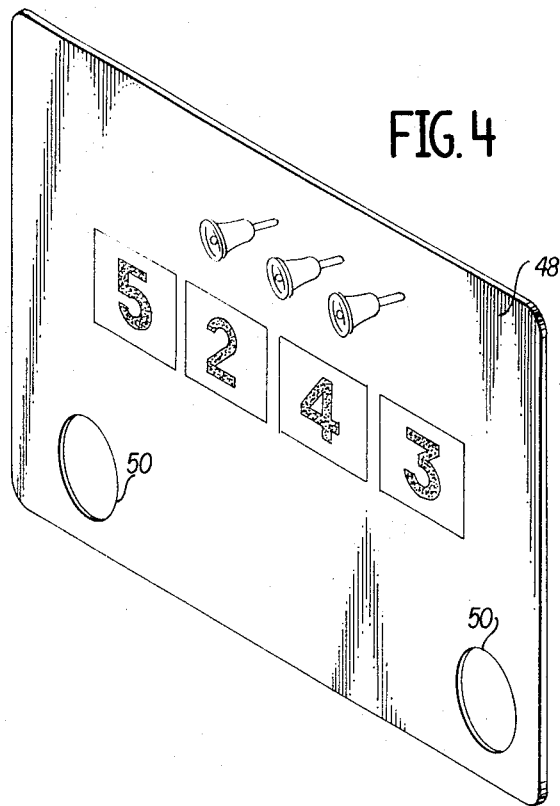
FIG. 4 is a perspective view illustrating a sample card provided with indicia designating a problem and four possible solutions thereto corresponding to the four operating members provided on the housing of the educational device.

Each of the playing cards 48 is provided with a problem to be solved by the child and four multiple choice answers thereto. In FIG. 4, for example, the playing card 48 illustrates three bells and four possible answers 5, 2, 4 and 3. The four possible answers correspond to the four operating levers 26. Since there are three bells the correct answer is 3 and the operating lever 26 at the right-hand side of the housing should be depressed.

Each of the cards 48 is additionally provided with coded cut-out portions 50 at the bottom thereof. As will be apparent from FIGS. 2, 3 and 7, the coded cut-out portions 50 within each card 48 are position adjacent the windows 38 and the uppermost position of the marbles 20.

The coded cut-out portions 50 are positioned on the card 48 so as to permit a marble 20 to pass from the storage compartment 18 through the cut-out portion 50 and one of the windows 38 into the receptacle 24 only when the correct operating member 26 is depressed. If the incorrect operating member 26 is depressed the remaining portions of the card 48 block the marble 20 from passing through the windows 38.

If in the example illustrated in FIG. 4 the child selects the correct answer 3 and depresses the operating member 26 at the right-hand side of the housing, the marble 20 is raised upwardly within the right-hand storage compartment 18 and is permitted to pass through coded cut-out portion 50 and the window 38 which, as illustrated in FIG. 7, are aligned with each other. No marbles may pass from the remaining storage compartments 18 into the receptacle 24 since portions of the card 48 block the remaining portions of the windows 38.

In like manner, the coded cut-out portions of every card 48 are arranged and correlated with the correct answers to the questions posed so as to permit the marbles to pass downwardly from the respective storage chambers 18 into the receptacle 24 only as the correct answers are chosen.

The problems presented to the child are unlimited in variety, including but not limited to arithmetic and matching.

I claim:

1. An educational device, comprising:
   a housing;
   a plurality of storage compartments within said housing, a block mounted within each of said storage compartments for sliding movement therein and playing pieces within said storage compartments and located above said block of each compartment;
   a receptacle formed within said housing;
   passage means connecting the upper portion of each of said storage compartments and said receptacle;
   a slot formed within said housing and intersecting said passage;
   a plurality of operating members mounted to said housing and means connecting said members and said blocks such that as each of said members is actuated its corresponding block is moved upwardly within said compartment raising said playing piece to the upper portion thereof adjacent said passage; and
   a card inserted within said slot, said card including indicia at the top thereof and visible to the user designating a problem to be solved as well as multiple choice answers thereto, said answers corresponding in number to said operating members and said storage compartments, said card further comprising means defining a coded answer to said problem permitting a playing piece to pass from said upper portion of said storage compartment corresponding to the correct answer through said passage into said receptacle only as said operating member corresponding to the correct answer is actuated.

2. An educational device as in claim 1, wherein said coded answer comprises an opening within said card, said opening positioned adjacent said passage so as to form an extension thereof and also positioned adjacent the upper portion of said storage compartment corresponding to the correct answer so as to permit a playing piece to pass from said storage compartment corresponding to the correct answer into said passage while the remaining portions of said passage connecting the remaining storage compartments to said receptacle are blocked by said card.

3. An educational device as in claim 1, including a member operatively mounted for rotation within said housing and means normally urging same to block said passage, said member including a portion normally extending within said slot such that as said card is inserted within said slot said card pushes against said portion causing said member to be rotated away from said passage.

4. An educational device as in claim 1, wherein said playing pieces are spherical in configuration and said coded answer comprises a circular opening through which said spherical member may pass.

5. An educational device as in claim 1, wherein said means connecting said operating members and said blocks comprises means mounting said operating members for rotation about an axis, each of said operating members terminating in an end portion secured within one of said blocks such that as the other end of said operating members is depressed said end portion thereof is raised causing said blocks to be raised.

* * * * *